United States Patent
Inomata

(10) Patent No.: US 12,266,475 B2
(45) Date of Patent: Apr. 1, 2025

(54) CERAMIC ELECTRONIC DEVICE, DIELECTRIC MATERIAL, AND MANUFACTURING METHOD OF CERAMIC ELECTRONIC DEVICE

(71) Applicant: TAIYO YUDEN CO., LTD., Tokyo (JP)

(72) Inventor: Yasuyuki Inomata, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 138 days.

(21) Appl. No.: 18/177,661

(22) Filed: Mar. 2, 2023

(65) Prior Publication Data
US 2023/0298821 A1 Sep. 21, 2023

(30) Foreign Application Priority Data
Mar. 17, 2022 (JP) .................. 2022-042626

(51) Int. Cl.
*H01G 4/12* (2006.01)
*H01G 4/30* (2006.01)

(52) U.S. Cl.
CPC ............. *H01G 4/1245* (2013.01); *H01G 4/30* (2013.01)

(58) Field of Classification Search
CPC .................. H01G 4/1245; H01G 4/30
See application file for complete search history.

(56) References Cited

U.S. PATENT DOCUMENTS

| | | | |
|---|---|---|---|
| 6,118,648 A | 9/2000 | Kojima et al. | |
| 11,283,085 B1* | 3/2022 | Leming | H01M 4/9066 |
| 11,515,543 B1* | 11/2022 | Scheetz | H01M 8/24 |
| 2018/0272137 A1* | 9/2018 | Seitz | H01L 23/15 |
| 2020/0185741 A1* | 6/2020 | Sudhan Shanmugam | H01M 8/04753 |
| 2020/0381179 A1* | 12/2020 | Yoon | H01G 4/30 |
| 2020/0411249 A1* | 12/2020 | Shimura | H01G 4/248 |
| 2021/0020364 A1* | 1/2021 | Inomata | C04B 35/4682 |
| 2021/0155547 A1* | 5/2021 | Nomura | C04B 35/64 |
| 2022/0040676 A1* | 2/2022 | Kakinohana | B01J 35/615 |
| 2023/0020073 A1* | 1/2023 | Shi | C09K 3/1463 |

FOREIGN PATENT DOCUMENTS

| | | |
|---|---|---|
| JP | H10335169 A | 12/1998 |
| JP | 2005179105 A | 7/2005 |
| WO | WO-2021193490 A1 * | 9/2021 |

* cited by examiner

*Primary Examiner* — Michael P McFadden
(74) *Attorney, Agent, or Firm* — Law Office of Katsuhiro Arai

(57) ABSTRACT

A ceramic electronic device includes a dielectric layer and an internal electrode layer that are alternately stacked. The dielectric layer contains ceria zirconia solid solution and $(Ca_{x1}Ba_{x2}Sr_{1-x1-x2})(Ti_yZr_{1-y})O_3$ ($0.6 \leq x_1 \leq 0.9$, $0 \leq x_2 \leq 0.1$, $0 \leq y \leq 0.1$) as a main component. In the dielectric layer, a concentration of the ceria zirconia solid solution is 0.5 mol % or more and 5.0 mol % or less when $(Ca_{x1}Ba_{x2}Sr_{1-x1-x2})(Ti_yZr_{1-y})O_3$ is 100 mol %.

11 Claims, 8 Drawing Sheets

CERAMIC ELECTRONIC DEVICE, DIELECTRIC MATERIAL, AND MANUFACTURING METHOD OF CERAMIC ELECTRONIC DEVICE

CROSS-REFERENCE TO RELATED APPLICATION

This application is based upon and claims the benefit of priority of the prior Japanese Patent Application No. 2022-042626, filed on Mar. 17, 2022, the entire contents of which are incorporated herein by reference.

FIELD

A certain aspect of the present disclosure relates to a ceramic electronic device, a dielectric material and a manufacturing method of the ceramic electronic device.

BACKGROUND

Ceramic electronic devices such as multilayer ceramic capacitors in which internal electrode layers and dielectric layers are alternately stacked are known. The ceramic electronic devices are produced by stacking a metal conductive paste for forming an internal electrode layer and a dielectric green sheet for a dielectric layer, and firing these stacked structure. During firing, the internal electrode layer containing metal as the main component shrinks faster than the dielectric layer, so cracks may occur in these layers. To prevent this, it is effective to lower the firing temperature. For example, Japanese Patent Application Publication No. H10-335169 hereinafter referred to as Patent Document 1 discloses a dielectric material that can be fired at 1300° C. or lower. Further, in Japanese Patent Application Publication No. 2005-179105 hereinafter referred to as Patent Document 2, the firing temperature is lowered by using a glass component having a low softening point temperature in a dielectric material.

SUMMARY OF THE INVENTION

According to an aspect of the embodiments, there is provided a ceramic electronic device including: a dielectric layer and an internal electrode layer that are alternately stacked, wherein the dielectric layer contains ceria zirconia solid solution and $(Ca_{x1}Ba_{x2}Sr_{1-x1-x2})(Ti_yZr_{1-y})O_3$ ($0.6 \leq x_1 \leq 0.9$, $0 \leq x_2 \leq 0.1$, $0 \leq y \leq 0.1$) as a main component, and wherein, in the dielectric layer, a concentration of the ceria zirconia solid solution is 0.5 mol % or more and 5.0 mol % or less when $(Ca_{x1}Ba_{x2}Sr_{1-x1-x2})(Ti_yZr_{1-y})O_3$ is 100 mol %.

According to another aspect of the embodiments, there is provided a dielectric material including: ceria zirconia solid solution; and $(Ca_{x1}Ba_{x2}Sr_{1-x1-x2})(Ti_yZr_{1-y})O_3$ ($0.6 \leq x_1 \leq 0.9$, $0 \leq x_2 \leq 0.1$, $0 \leq y \leq 0.1$) as a main component, wherein a concentration of the ceria zirconia solid solution is 0.5 mol % or more and 5.0 mol % or less when the main component is 100 mol %.

According to another aspect of the embodiments, there is provided a manufacturing method of a ceramic electronic device including: forming a multilayer structure in which a dielectric green sheet including ceramic powders and a metal conductive paste for forming an internal electrode layer are alternately stacked; and firing the multilayer structure, wherein the ceramic powders include ceria zirconia solid solution and $(Ca_{x1}Ba_{x2}Sr_{1-x1-x2})(Ti_yZr_{1-y})O_3$ ($0.6 \leq x_1 \leq 0.9$, $0 \leq x_2 \leq 0.1$, $0 \leq y \leq 0.1$) as a main component, and wherein, in the ceramic powders, a concentration of the ceria zirconia solid solution is 0.5 mol % or more and 5.0 mol % or less when $(Ca_{x1}Ba_{x2}Sr_{1-x1-x2})(Ti_yZr_{1-y})O_3$ is 100 mol %.

DETAILED DESCRIPTION

In order to effectively suppress the cracking in the dielectric layer, it is preferable to further lower the firing temperature than the 1300° C. disclosed in Patent Document 1. Further, when the glass component is used as in Patent Document 2, the ceramic particles may be aggregated at the time of firing, the smoothness of the dielectric layer may be degraded, and the mechanical strength thereof may be lowered. Further, if an attempt is made to achieve both a low firing temperature and an improvement in mechanical strength, the quality of the dielectric layer may deteriorate.

Hereinafter, an exemplary embodiment will be described with reference to the accompanying drawings.

Exemplary Embodiment

Figure 1:
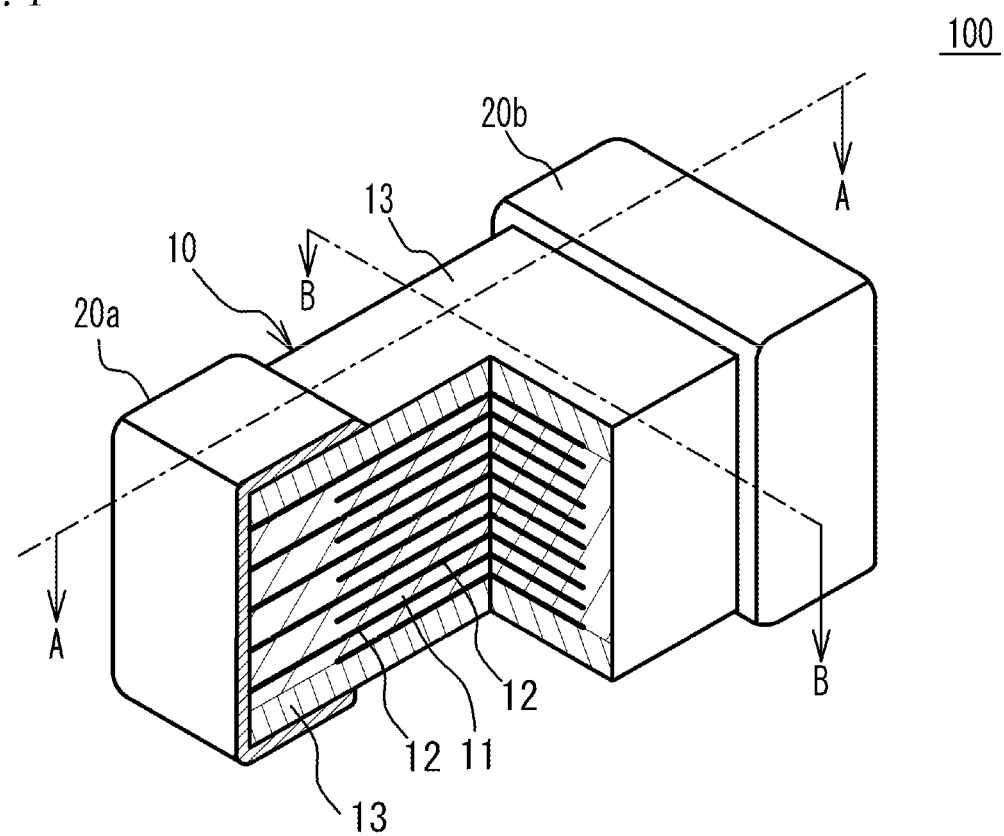
FIG. 1 is a partial cross-sectional perspective view of a multilayer ceramic capacitor.
Figure 2:
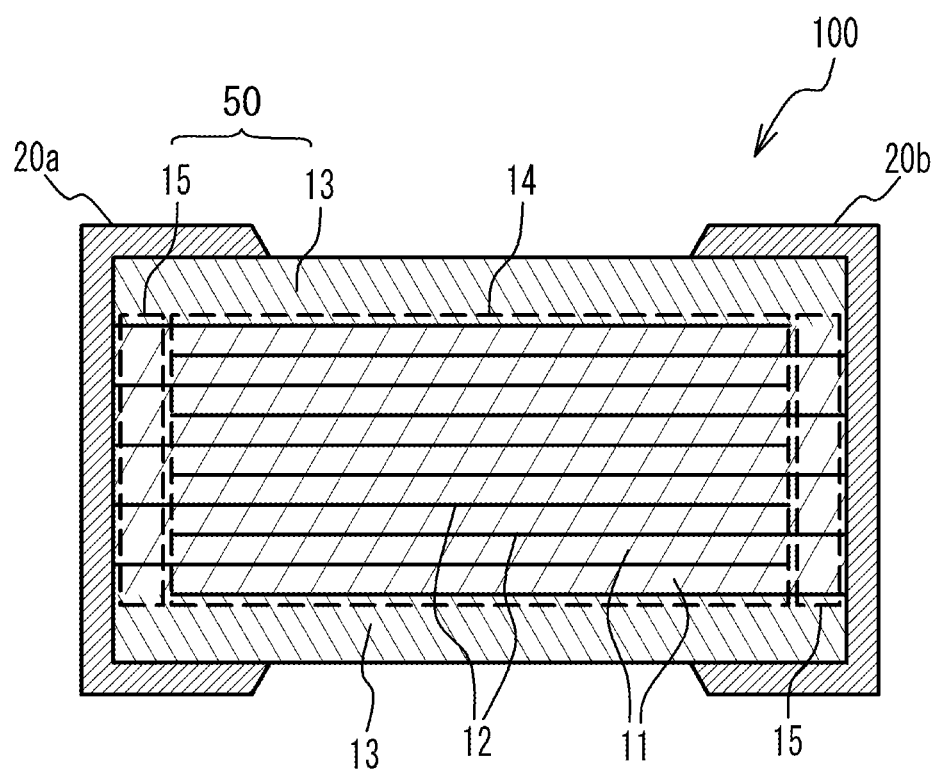
FIG. 2 is a cross-sectional view taken along line A-A in FIG. 1.
Figure 3:
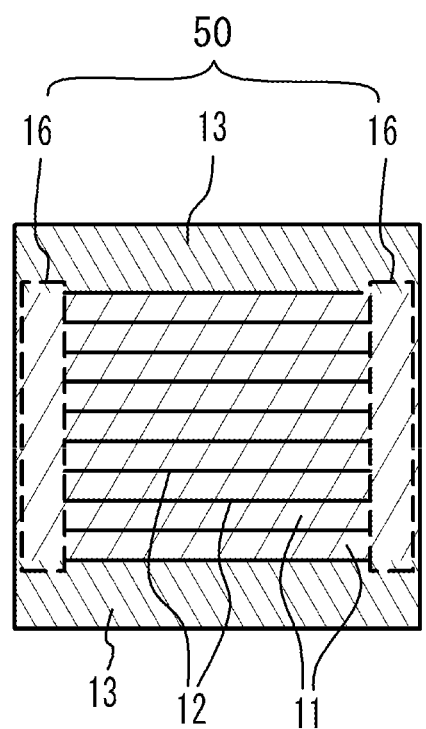
FIG. 3 is a cross-sectional view taken along line B-B in FIG. 1.

A description will be given of an outline of a multilayer ceramic capacitor. FIG. 1 illustrates a perspective view of a multilayer ceramic capacitor 100 in accordance with an embodiment, in which a cross section of a part of the multilayer ceramic capacitor 100 is illustrated. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two edge faces of the multilayer chip 10 facing each other. Among four faces other than the two edge faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 contains a ceramic material acting as a dielectric material. The internal electrode layer 12 contains a base metal. End edges of the internal electrode layers 12 are alternately exposed to a first end face of the multilayer chip 10 and a second end face of the multilayer chip 10 that is different from the first end face.

The external electrode 20a is provided on the first end face. The external electrode 20b is provided on the second end face. Thus, the internal electrode layers 12 are alternately electrically connected to the external electrode 20a and the external electrode 20b. Accordingly, the multilayer ceramic capacitor 100 has a structure in which a plurality of the dielectric layers 11 are stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11.

A thickness of the dielectric layer 11 is preferably 2 μm or less from a viewpoint of increasing the capacity of the multilayer ceramic capacitor 100. A thickness of the internal electrode layer 12 is 0.3 μm or more and 1.5 μm or less, more preferably 0.5 μm or more and 1.0 μm or less. This is because, within the thickness range, it is possible to achieve low cost, obtain capacity caused by continuity of the internal electrode layer 12, and to stably fire the internal electrode layer 12. For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin 15. The section where the internal electrode layers 12 connected to the external electrode 20b face each other with no internal electrode layer 12 connected to the external electrode 20a interposed therebetween is also the end margin 15. That is, the end margin 15 is a section where the internal electrode layers 12 connected to one of the external electrodes face each other with no internal electrode layer 12 connected to the other of the external electrodes interposed therebetween.

As illustrated in FIG. 3, in the multilayer chip 10, the section from each of the two side faces of the multilayer chip 10 to the internal electrode layers 12 is referred to as a side margin 16. That is, the side margin 16 is a section that covers each of the edges, extending toward the respective side faces of the multilayer structure, of the stacked internal electrode layers 12. The side margin 16 is a section where no capacity is generated.

The cover layers 13 and the side margins protect the capacity section 24 by covering the circumference of the capacity section 14. Hereinafter, the cover layers 13 and the side margins 16 are referred to as a protection section 50.

A main component of the internal electrode layer 12 is a base metal such as nickel (Ni), copper (Cu), or the like. The main component of the internal electrode layer 12 may be a noble metal such as platinum (Pt), palladium (Pd), silver (Ag), or gold (Au), tin (Sn) or alloy including one or more of them.

The dielectric layer 11 contains a perovskite compound as a main component and contains ceria zirconia solid solution. In the ceria zirconia solid solution, ceria ($CeO_2$) is solid-solved in zirconia ($ZrO_2$). In this embodiment, $(Ca_{x1}Ba_{x2}Sr_{1-x1-x2})(Ti_yZr_{1-y})O_3$ is used as the perovskite compound. The ceria zirconia solid solution has higher strength and higher toughness than perovskite compounds used as dielectrics. Therefore, even if the dielectric layers 11 and the internal electrode layers 12 are fired at a low temperature, the mechanical strength of the dielectric layers 11 can be increased. Yttria ($Y_2O_3$) is an example of rare earth oxide which is solid solved in zirconia. However, when yttria is solid-solved in zirconia, due to the difference in valence of zirconium ion and yttrium ion, oxygen vacancies occur during solid solution, which is a factor that lowers the insulation at high temperatures in particular. Such a phenomenon is less likely to occur because the same valence is used, when ceria is solid solved in zirconia. Therefore, deterioration of insulation at high temperatures can be suppressed. The perovskite structure contains $ABO_{3-\alpha}$ outside the stoichiometric composition.

Further, when the concentration of the ceria zirconia solid solution exceeds 5.0 mol % when $(Ca_{x1}Ba_{x2}Sr_{1-x1-x2})(Ti_yZr_{1-y})O_3$ is 100 mol %, the ceria zirconia solid solution may suppress densification of the dielectric layer 11 during the firing. Therefore, when $(Ca_{x1}Ba_{x2}Sr_{1-x1-x2})(Ti_yZr_{1-y})O_3$ is 100 mol %, the concentration of the ceria zirconia solid solution is preferably 5.0 mol % or less. On the other hand, when the concentration of the ceria zirconia solid solution is less than 0.5 mol %, sufficient mechanical strength of the dielectric layer 11 may not be necessarily enhanced. Therefore, the concentration of the ceria zirconia solid solution is preferably 0.5 mol % or more.

In the present embodiment, the composition ratios of the main components $(Ca_{x1}Ba_{x2}Sr_{1-x1-x2})(Ti_yZr_{1-y})O_3$ are set to $0.6 \leq x_1 \leq 0.9$, $0 \leq x_2 \leq 0.1$, $0 \leq y \leq 0.1$. The concentration of the ceria zirconia solid solution is 0.5 mol % or more and 5.0 mol % or less when $(Ca_{x1}Ba_{x2}Sr_{1-x1-x2})(Ti_yZr_{1-y})O_3$ is 100 mol %. Thereby, even if the dielectric layer 11 is fired at a low temperature, the quality such as the mechanical strength of the dielectric layer 11 can be maintained.

The dielectric layer of the multilayer ceramic capacitor is called Class I of EIA standard when the material is a normal dielectric, and is called Class II when the material is a ferroelectric substance. The dielectric layer 11 according to the present embodiment is a dielectric layer belonging to Class I.

The temperature characteristics of the dielectric layer 11 of Class 1 may change as the thickness of the dielectric layer 11 becomes thinner. It is considered that this is due to the difference in the coefficient of thermal expansion between the internal electrode layer 12 and the dielectric layer 11. The ceria zirconia solid solution also has a function of suppressing changes in temperature characteristic. When the ceria zirconia solid solution is not added to the dielectric layer 11, the composition ratios $x_1$, $x_2$, and y of the main component $(Ca_{x1}Ba_{x2}Sr_{1-x1-x2})(Ti_yZr_{1-y})O_3$ are adjusted to suppress changes in temperature characteristics. In the present embodiment, the change in the temperature characteristics of the dielectric layer 11 can be suppressed by simply adjusting the added amount of the ceria zirconia solid solution.

Further, the dielectric layer 11 may further contain a manganese compound, a silicon compound, and a boron compound. The sintering temperature of the dielectric layer 11 can be lowered by the combined action of these compounds. Examples of the manganese compound include MnO and $MnCO_3$, and examples of the silicon compound include $SiO_2$. Further, examples of the boron compound include boron oxide ($B_2O_3$), boron nitride, boric acid and the like.

In particular, it is preferable that the amount of the manganese compound in the dielectric layer 11 is 0.2 mol % or more and 5.0 mol % or less in a shape of MnO. It is preferable that the amount of the silicon compound in the dielectric layer 11 is 0.5 mol % or more and 5.0 mol % or less in a shape of $SiO_2$. It is preferable that the amount of the boron compound in the dielectric layer 11 is 0.2 mol % or more and 1.0 mol % or less in a shape of $(B_2O_3)/2$. The compound concentrations are concentrations on a presumption that $(Ca_{x1}Ba_{x2}Sr_{1-x1-x2})(Ti_yZr_{1-y})O_3$ is 100 mol %. By adopting these concentration ranges, it becomes easy to fire the dielectric layer 11 at a low temperature of 1220° C. or lower.

Figure 4:
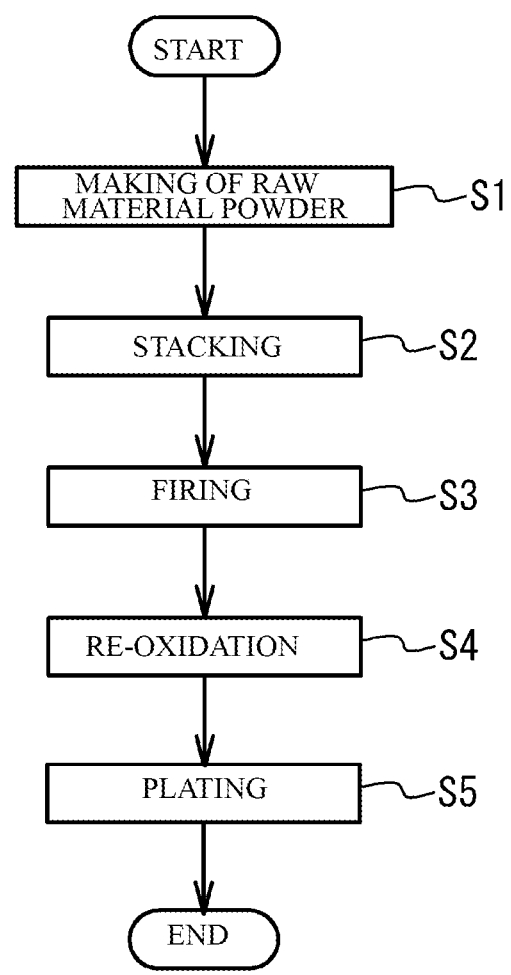
FIG. 4 illustrates a flow of a manufacturing method of a multilayer ceramic capacitor.

Next, the manufacturing method of the multilayer ceramic capacitor 100 will be described. FIG. 4 is a flowchart of the manufacturing method of the multilayer ceramic capacitor 100.

[Making of Raw Material Powder] (S1)

A starting material for forming the dielectric layer 11 is prepared. Here, as the starting material, $SrCO_3$ powder, $CaCO_3$ powder, $TiO_2$ powder, $BaCO_3$ powder and $ZrO_2$ powder are prepared. Then, each powder is weighed. The weighed powder is dispersed in ion-exchanged water and a dispersant. Thus, a dielectric material is obtained.

Next, the dielectric material is dried, then subjected to dry pulverization, and further calcined at 1100° C. to obtain $(Ca_{x1}Ba_{x2}Sr_{1-x1-x2})(Ti_yZr_{1-y})O_3$ powder as the perovskite powder which is the main component of the dielectric layer 11. In this embodiment, $0.6 \leq x_1 \leq 0.9$, $0 \leq x_2 \leq 0.1$, and $0 \leq y \leq 0.1$.

Next, a reverse pattern material for forming the end margin 15 and the side margin 16 is prepared. The reverse pattern material includes a main component ceramic of the end margin of 15 and the side margin 16. As the main component ceramic, $(Ca_{x1}Ba_{x2}Sr_{1-x1-x2})(Ti_yZr_{1-y})O_3$ powder is prepared in the same manner as above.

Next, a cover material for forming the cover layer 13 is prepared. The cover material contains the main component ceramic of the cover layer 13. As the main component ceramic, $(Ca_{x1}Ba_{x2}Sr_{1-x1-x2})(Ti_yZr_{1-y})O_3$ powder is prepared in the same manner as above.

Next, the starting material of the ceria zirconia solid solution is prepared. For example, $ZrO_2$ with a specific surface area of 30 $m^2/g$ and $CeO_2$ with a specific surface area of 50 $m^2/g$ are prepared. Next, these are weighed in predetermined amounts and dispersed with ion-exchanged water and a dispersant in a ball mill to obtain a mixture of ceria and zirconia.

Next, the mixture is dried, then dry pulverized, and further calcined at 1200° C. to obtain a ceria zirconia solid solution powder.

[Stacking Process] (S2)

Next, a ceramic powder obtained by adding a manganese compound, a silicon compound, a boron compound, and ceria zirconia solid solution to the perovskite powder obtained in the raw material powder making process is prepared. And the ceramic powder is prepared together with an organic solvent, a binder, a dispersant, and the like. Thus, a slurry is obtained by performing a ball mill treatment. In this case, when $(Ca_{x1}Ba_{x2}Sr_{1-x1-x2})(Ti_yZr_{1-y})O_3$ is 100 mol %, the concentration of the ceria zirconia solid solution is set to 0.5 mol % or more and 5.0 mol % or less.

The concentration of ceria ($CeO_2$) in the ceria zirconia solid solution is 6 mol % to 18 mol %. A ceria zirconia solid solution with a ceria concentration of 6 mol % and a zirconia concentration of 94 mol % is hereinafter referred to as 6CEZ. The ceria zirconia solid solution with a ceria concentration of 10 mol % and a zirconia concentration of 90 mol % is hereinafter referred to as 10CEZ. The ceria zirconia solid solution with a ceria concentration of 18 mol % and a zirconia concentration of 82 mol % is hereinafter referred to as 18CEZ.

The manganese compound is, for example, $MnCO_3$, which is added to the ceramic powder at a concentration of 0.2 mol % to 5.0 mol % in terms of MnO. On the other hand, the silicon compound is, for example, $SiO_2$, which is added to the ceramic powder at a concentration of 0.5 mol % to 5.0 mol %. Further, the boron compound is, for example, boron nitride, which is added to the ceramic powder at a concentration of 0.2 mol % to 1.0 mol % in terms of $(B_2O_3)/2$. These concentration are molar concentration $(Ca_{x1}Ba_{x2}Sr_{1-x1-x2})(Ti_yZr_{1-y})O_3$ is 100 mol %.

Since boron nitride is difficult to elute in an organic solvent, gelation of the slurry can be suppressed. In particular, boron nitride having a specific surface area of 100 $m^2/g$ or more and 300 $m^2/g$ or less can effectively suppress gelation of the slurry. $B_2O_3$ or boric acid may be used instead of boron nitride.

After that, the slurry is tape-casted on a base material such as a PET (polyethylene terephthalate) film to obtain a dielectric green sheet having a thickness of about 3 μm.

Next, a metal conductive paste is printed on the surface of the dielectric green sheet by screen printing or gravure printing. The metal conductive paste contains an organic binder. The metal conductive paste includes nickel powder. Ceramic particles are added as a co-material to the metal conductive paste. The main component of the ceramic particles is not particularly limited, but is preferably the same as the main component ceramic of the dielectric layer 11.

Figure 5A:
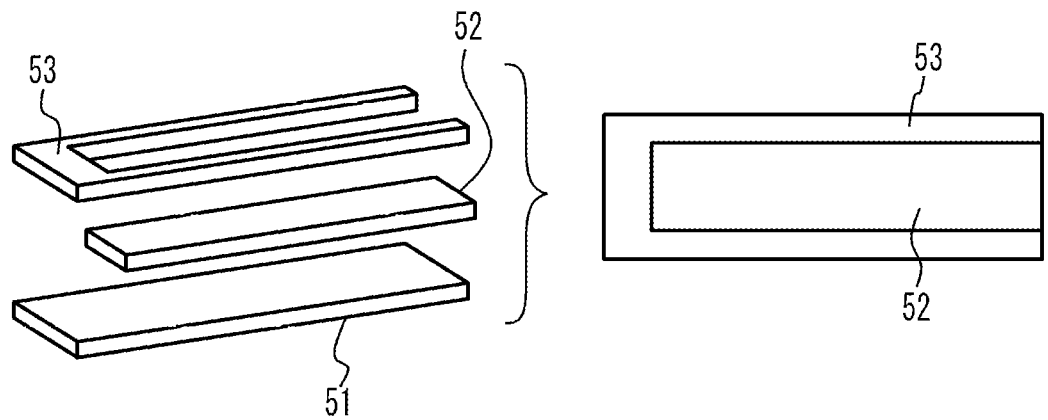
FIG. 5A and FIG. 5B illustrate a sacking process.

As illustrated in FIG. 5A, a first pattern 52 is formed on the surface of a dielectric green sheet 51 by printing a metal conductive paste for forming the internal electrode with use of screen printing or gravure printing. The metal conductive paste for forming the internal electrode contains an organic binder. The metal conductive paste includes nickel powder. Ceramic particles are added as the co-material to the metal conductive paste. The main component of the ceramic particles is not particularly limited, but is preferably the same as the main component ceramic of the dielectric layer 11.

Next, a binder such as ethyl cellulose and an organic solvent such as terpineol are added to the reverse pattern material obtained in the raw material powder making process, and kneaded with a roll mill to obtain a reverse pattern paste for the reverse pattern layer. As illustrated in FIG. 5A, a second pattern 53 is formed by printing the reverse pattern paste in the peripheral region, where the first pattern 52 is not printed, on the dielectric green sheet 51 to cause the second pattern 53 and the first pattern 52 to form a flat surface.

Figure 5B:
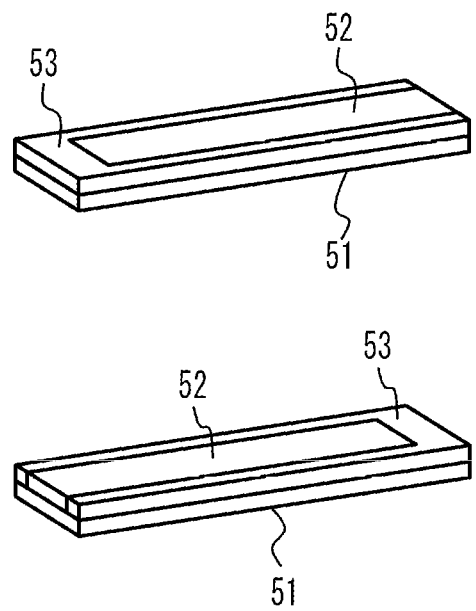

Thereafter, as illustrated in FIG. 5B, a predetermined number of stack units, in which the first pattern 52 and the second pattern 53 are printed on the dielectric green sheet 51, are stacked so that the internal electrode layers 12 and the dielectric layers 11 are alternated with each other and the end edges of the internal electrode layers 12 are alternately exposed to both edge faces in the length direction of the dielectric layer 11 so as to be alternately led out to a pair of the external electrodes 20a and 20b of different polarizations. For example, 100 to 500 stack units are stacked.

Figure 6:
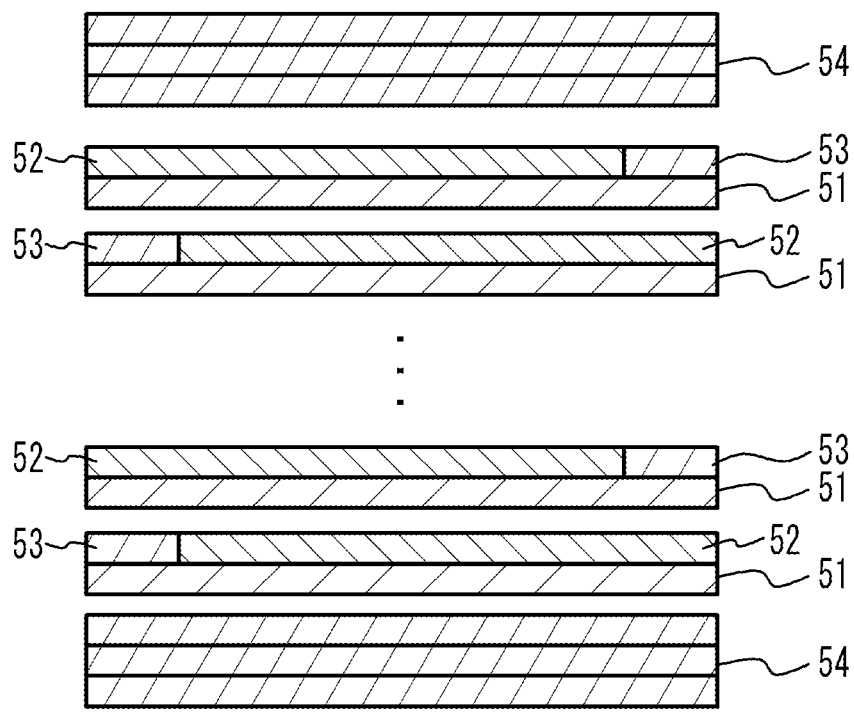
FIG. 6 illustrates a stacking process.

Next, a binder such as polyvinyl butyral (PVB) resin, an organic solvent such as ethanol and toluene, and a plasticizer are added to the cover material obtained in the raw material powder making process and wet-mixed. Using the obtained slurry, for example, a strip-shaped cover sheet 54 having a thickness of 10 μm or less is applied onto a base material by, for example, a die coater method or a doctor blade method, and dried. As illustrated in FIG. 6, a predetermined number (for example, 2 to 10) cover sheet 54 are stacked on the stacked stack units and under the stacked stack units. After that, the stacked structure is thermally crimped. The resulting stacked structure is stamped into a predetermined size (for example, 1.0 mm×0.5 mm). Thus, a ceramic multilayer structure is obtained. Alternatively, after stacking a predetermined number of the cover sheet 54 and crimping the cover sheets 54, the resulting cover sheets 54 may be attached to on the stacked stack units and under the stacked stack units.

In the methods of FIG. 5A to FIG. 6, the region in which the portion of the dielectric green sheet 51 corresponding to the first pattern 52, and the first pattern 52 are stacked is a multilayer portion in which a sheet including $(Ca_{x1}Ba_{x2}Sr_{1-x1-x2})(Ti_yZr_{1-y})O_3$ particles as the main component ceramic and a pattern of a metal conductive paste are alternately stacked. The regions in which a part of the dielectric green sheet 51 which protrudes from the first pattern 52, and the second pattern 53 are stacked correspond to the side margin sections arranged on both side faces of the multilayer portion.

Figure 7:
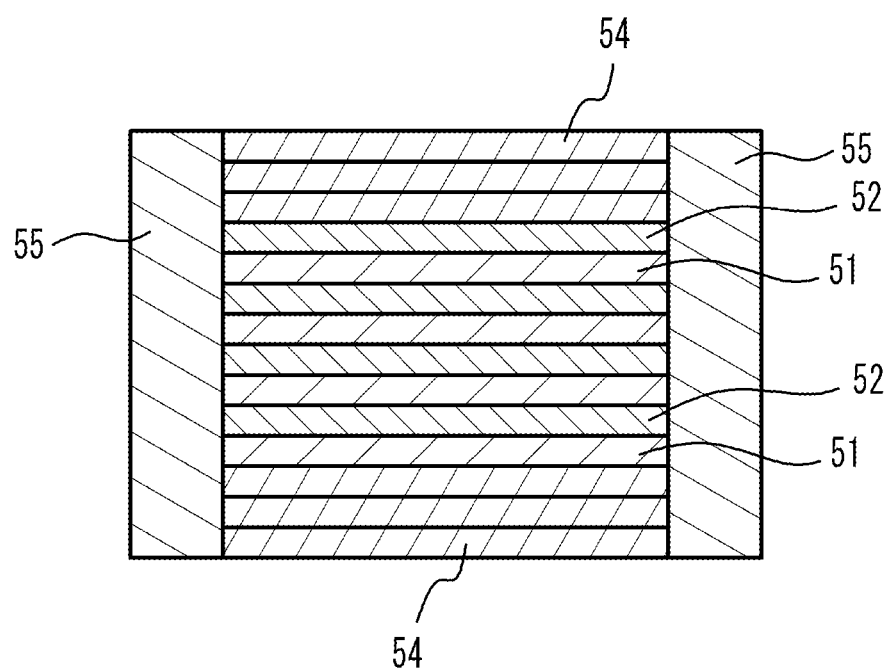
FIG. 7 illustrates a stacking process.

The side margin section may be attached or applied to the side faces of the multilayer portion. Specifically, as illustrated in FIG. 7, the dielectric green sheet 51 and the first pattern 52 having the same width as the dielectric green sheet 51 are alternately stacked to obtain the multilayer portion. Next, side margin sections may be formed by attaching a sheet formed of the reverse pattern paste or by using the second pattern 53 obtained by painting the reverse pattern paste.

[Firing Process] (S3)

The binder is removed from the resulting ceramic multilayer structure in $N_2$ atmosphere. After that, a Ni paste to be the base layer of the external electrodes 20a and 20b is applied to the resulting ceramic multilayer by a dipping or the like. The resulting ceramic multilayer structure is fired in a reducing atmosphere with an oxygen partial pressure of $10^{-5}$ to $10^{-8}$ atm in a temperature of 1220° C. or less 10 minutes to 2 hours. Thus, the multilayer ceramic capacitor 100 is formed. In the firing process, the external electrodes may be baked after firing the ceramic multilayer structure.

[Re-Oxidation Process] (S4)

After that, the multilayer ceramic capacitor 100 may be subjected to a re-oxidation process in a temperature range of 600 degrees C. to 1000 degrees C. in $N_2$ gas atmosphere.

[Plating Process] (S5)

After that, metal layers such as Cu, Ni, and Sn may be formed on the external electrodes 20a and 20b by plating.

According to the above-described embodiment, the dielectric layer 11 contains the ceria zirconia solid solution and the main component $(Ca_{x1}Ba_{x2}Sr_{1-x1-x2})(Ti_yZr_{1-y})O_3$ ($0.6 \leq x_1 \leq 0.9$, $0 \leq x_2 \leq 0.1$, $0 \leq y \leq 0.1$). And the concentration of the ceria zirconia solid solution is 0.5 mol % or more and 5.0 mol % or less when $(Ca_{x1}Ba_{x2}Sr_{1-x1-x2})(Ti_yZr_{1-y})O_3$ is 100 mol %.

Thereby, even if the temperature in the firing step is as low as 1220° C. or lower, the mechanical strength of the dielectric layer 11 can be increased by the mechanically strong ceria zirconia solid solution.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

Examples

Next, examples and comparative examples will be described. Table 1 shows conditions of the examples and the comparative examples.

TABLE 1

| | $(Ca_{x1}Ba_{x2}Sr_{1-x1-x2})(Ti_yZr_{1-y})O_3$ | | | MnO | $SiO_2$ | $(B_2O_3)/2$ | CERIA ZIRCONIA SOLID SOLUTION | |
|---|---|---|---|---|---|---|---|---|
| | x1 | x2 | y | (mol %) | (mol %) | (mol %) | TYPE | mol % |
| EXAMPLE 1 | 0.7 | 0 | 0.03 | 1 | 1 | 0.3 | 6CEZ | 2 |
| EXAMPLE 2 | 0.7 | 0 | 0.03 | 0.2 | 2 | 0.2 | 6CEZ | 2 |
| EXAMPLE 3 | 0.7 | 0 | 0.03 | 1.5 | 1 | 0.3 | 6CEZ | 2 |
| COMPARATIVE EXAMPLE 1 | 0.5 | 0 | 0.03 | 1 | 1 | 0.2 | 6CEZ | 2 |
| EXAMPLE 4 | 0.6 | 0 | 0.03 | 1 | 3 | 0.2 | 6CEZ | 2 |
| EXAMPLE 5 | 0.9 | 0 | 0.03 | 2 | 0.5 | 0.5 | 6CEZ | 2.5 |
| COMPARATIVE EXAMPLE 2 | 0.95 | 0 | 0.03 | 1 | 1 | 0.3 | 6CEZ | 3 |
| EXAMPLE 6 | 0.7 | 0 | 0 | 3 | 5 | 1 | 6CEZ | 1.5 |
| EXAMPLE 7 | 0.7 | 0 | 0.05 | 5 | 1 | 0.2 | 6CEZ | 2 |
| EXAMPLE 8 | 0.8 | 0 | 0.07 | 0.2 | 1 | 0.7 | 6CEZ | 1.5 |
| EXAMPLE 9 | 0.8 | 0 | 0.1 | 2 | 1 | 0.4 | 6CEZ | 0.5 |
| COMPARATIVE EXAMPLE 3 | 0.8 | 0 | 0.12 | 1.5 | 1 | 0.4 | 6CEZ | 1.5 |

TABLE 1-continued

| | $(Ca_{x1}Ba_{x2}Sr_{1-x1-x2})(Ti_yZr_{1-y})O_3$ | | | MnO | $SiO_2$ | $(B_2O_3)/2$ | CERIA ZIRCONIA SOLID SOLUTION | |
|---|---|---|---|---|---|---|---|---|
| | x1 | x2 | y | (mol %) | (mol %) | (mol %) | TYPE | mol % |
| EXAMPLE 10 | 0.7 | 0 | 0.03 | 0.1 | 0.5 | 0.4 | 6CEZ | 1 |
| EXAMPLE 11 | 0.7 | 0 | 0.03 | 7 | 2 | 0.3 | 6CEZ | 3 |
| EXAMPLE 12 | 0.7 | 0 | 0.03 | 1 | 0.4 | 0.3 | 6CEZ | 2 |
| EXAMPLE 13 | 0.7 | 0 | 0.03 | 1 | 5.2 | 0.2 | 6CEZ | 3.5 |
| EXAMPLE 14 | 0.7 | 0 | 0.03 | 1 | 1 | 0.1 | 6CEZ | 1.5 |
| EXAMPLE 15 | 0.7 | 0 | 0.03 | 1.5 | 1.5 | 1.2 | 6CEZ | 1.5 |
| COMPARATIVE EXAMPLE 4 | 0.7 | 0 | 0.03 | 1 | 1 | 0.3 | 6CEZ | 0.3 |
| EXAMPLE 16 | 0.7 | 0 | 0.03 | 1 | 1 | 0.3 | 6CEZ | 5 |
| COMPARATIVE EXAMPLE 5 | 0.7 | 0 | 0.03 | 1.5 | 2 | 0.5 | 6CEZ | 7 |
| EXAMPLE 17 | 0.7 | 0 | 0.03 | 1 | 1 | 0.4 | 10CEZ | 1 |
| EXAMPLE 18 | 0.7 | 0 | 0.04 | 1.5 | 1 | 0.3 | 10CEZ | 3 |
| EXAMPLE 19 | 0.7 | 0 | 0.04 | 2 | 1 | 0.3 | 18CEZ | 1 |
| EXAMPLE 20 | 0.7 | 0 | 0.04 | 1 | 2 | 0.3 | 18CEZ | 3 |
| EXAMPLE 21 | 0.7 | 0.01 | 0.03 | 1 | 1 | 0.3 | 6CEZ | 2 |
| EXAMPLE 22 | 0.65 | 0.1 | 0.03 | 1 | 1 | 0.3 | 6CEZ | 2 |
| COMPARATIVE EXAMPLE 6 | 0.45 | 0.15 | 0.05 | 1 | 1 | 0.3 | 6CEZ | 2 |

(Example 1) Each powder of $SrCO_3$, $CaCO_3$, $TiO_2$ and $ZrO_2$ was weighed and dispersed with ion-exchanged water and a dispersant in a ball mill to obtain a dielectric material. Next, the dielectric material was dried, then subjected to dry pulverization, and further calcined at 1100° C. to obtain $(Ca_{0.7}Sr_{0.3})(Ti_{0.03}Zr_{0.97})O_3$ powder as the perovskite powder, which was the main component of the dielectric layer 11.

In the perovskite powder, 1 mol % of manganese compound was added in a shape of $MnCO_3$, 1 mol % of silicon compound was added in a shape of $SiO_2$, and 0.3 mol % of boron compound was added in a shape of $(B_2O_3)/2$. Further, 2 mol % of 6CEZ was added to the perovskite powder. These concentrations are the concentrations when $(Ca_{x1}Ba_{x2}Sr_{1-x1-x2})(Ti_yZr_{1-y})O_3$ is 100 mol %. This also applies to each of the examples and the comparative examples described later.

The thickness of the dielectric layer 11 was 2 μm, and each number of layers of the internal electrode layer 12 and the dielectric layer 11 was 100. The chip size was 3.2×1.6×1.0 mm.

(Example 2) In the perovskite powder, 0.2 mol % of manganese compound was added in a shape of $MnCO_3$, 2 mol % of silicon compound was added in a shape of $SiO_2$, and 0.2 mol % of boron compound was added in a shape of $(B_2O_3)/2$. Other conditions were the same as those of the example 1.

(Example 3) In the perovskite powder, 1.5 mol % of manganese compound was added in a shape of $MnCO_3$, 1 mol % of silicon compound was added in a shape of $SiO_2$, and 0.3 mol % of boron compound was added in a shape of $(B_2O_3)/2$. Other conditions were the same as those of the example 1.

(Example 4) The value of $x_1$ in $(Ca_{x1}Ba_{x2}Sr_{1-x1-x2})(Ti_yZr_{1-y})O_3$, which was a material for perovskite powder, was set to 0.6.

In the perovskite powder, 1 mol % of manganese compound was added in a shape of $MnCO_3$, 3 mol % of silicon compound was added in a shape of $SiO_2$, and 0.2 mol % of boron compound was added in a shape of $(B_2O_3)/2$. Other conditions were the same as those of the example 1.

(Example 5) The value of $x_1$ in $(Ca_{x1}Ba_{x2}Sr_{1-x1-x2})(Ti_yZr_{1-y})O_3$, which was a material for perovskite powder, was set to 0.9.

In the perovskite powder, 2 mol % of manganese compound was added in a shape of $MnCO_3$, 0.5 mol % of silicon compound was added in a shape of $SiO_2$, and 0.5 mol % of boron compound was added in a shape of $(B_2O_3)/2$. Further, 2.5 mol % of 6CEZ was added to the perovskite powder. Other conditions were the same as those of the example 1.

(Example 6) The value of y in $(Ca_{x1}Ba_{x2}Sr_{1-x1-x2})(Ti_yZr_{1-y})O_3$, which was a material for perovskite powder, was set to 0.

In the perovskite powder, 3 mol % of manganese compound was added in a shape of $MnCO_3$, 5 mol % of silicon compound was added in a shape of $SiO_2$, and 1 mol % of boron compound was added in a shape of $(B_2O_3)/2$. Further, 1.5 mol % of 6CEZ was added to the perovskite powder. Other conditions were the same as those of the example 1.

(Example 7) The value of y in $(Ca_{x1}Ba_{x2}Sr_{1-x1-x2})(Ti_yZr_{1-y})O_3$, which was a material for perovskite powder, was set to 0.05.

In the perovskite powder, 5 mol % of manganese compound was added in a shape of $MnCO_3$, 1 mol % of silicon compound was added in a shape of $SiO_2$, and 0.2 mol % of boron compound was added in a shape of $(B_2O_3)/2$. Other conditions were the same as those of the example 1.

(Example 8) The value of $x_1$ in $(Ca_{x1}Ba_{x2}Sr_{1-x1-x2})(Ti_yZr_{1-y})O_3$, which was the material of the perovskite powder, was set to 0.8, and the value of y was set to 0.07.

In the perovskite powder, 0.2 mol % of manganese compound was added in a shape of $MnCO_3$, 1 mol % of silicon compound was added in a shape of $SiO_2$, and 0.7 mol % of boron compound was added in a shape of $(B_2O_3)/2$. Further, 1.5 mol % of 6CEZ was added to the perovskite powder. Other conditions were the same as those of the example 1.

(Example 9) The value of $x_1$ in $(Ca_{x1}Ba_{x2}Sr_{1-x1-x2})(Ti_yZr_{1-y})O_3$, which was the material of the perovskite powder, was set to 0.8, and the value of y was set to 0.1.

In the perovskite powder, 2 mol % of manganese compound was added in a shape of $MnCO_3$, 1 mol % of silicon compound was added in a shape of $SiO_2$, and 0.4 mol % of boron compound was added in a shape of $(B_2O_3)/2$. Further, 0.5 mol % of 6CEZ was added to the perovskite powder. Other conditions were the same as those of the example 1.

(Example 10) In the perovskite powder, 0.1 mol % of manganese compound was added in a shape of $MnCO_3$, 0.5 mol % of silicon compound was added in a shape of $SiO_2$, and 0.4 mol % of boron compound was added in a shape of $(B_2O_3)/2$. Further, 1 mol % of 6CEZ was added to the perovskite powder. Other conditions were the same as those of the example 1.

(Example 11) In the perovskite powder, 7 mol % of manganese compound was added in a shape of $MnCO_3$, and 2 mol % of silicon compound was added in a shape of $SiO_2$. Further, 3 mol % of 6CEZ was added to the perovskite powder. Other conditions were the same as those of the example 1.

(Example 12) $SiO_2$ was added as a silicon compound to the perovskite powder at a concentration of 0.4 mol %. Other conditions were the same as those of the example 1.

(Example 13) In the perovskite powder, 5.2 mol % of silicon compound was added in a shape of $SiO_2$, and 0.2 mol % of boron compound was added in a shape of $(B_2O_3)/2$. Further, 3.5 mol % of 6CEZ was added to the perovskite powder. Other conditions were the same as those of the example 1.

(Example 14) In the perovskite powder, 0.1 mol % of boron compound was added in a shape of $(B_2O_3)/2$. Further, 1.5 mol % of 6CEZ was added to the perovskite powder. Other conditions were the same as those of the example 1.

(Example 15) In the perovskite powder, 1.5 mol % of manganese compound was added in a shape of $MnCO_3$, 1.5 mol % of silicon compound was added in a shape of $SiO_2$, and 1.2 mol % of boron compound was added in a shape of $(B_2O_3)/2$. Further, 1.5 mol % of 6CEZ was added to the perovskite powder. Other conditions were the same as those of the example 1.

(Example 16) 6CEZ was added to the perovskite powder at a concentration of 5 mol %. Other conditions were the same as those of the example 1.

(Example 17) In the perovskite powder, 0.4 mol % of boron compound was added in a shape of $(B_2O_3)/2$. Further, 10CEZ was added to the perovskite powder. Other conditions were the same as those of the example 1.

(Example 18) The value of y in $(Ca_{x1}Ba_{x2}Sr_{1-x1-x2})(Ti_yZr_{1-y})O_3$, which was a material for perovskite powder, was set to 0.04.

In the perovskite powder, 1.5 mol % of manganese compound was added in a shape of $MnCO_3$. Further, 3 mol % of 10CEZ was added to the perovskite powder. Other conditions were the same as those of the example 1.

(Example 19) The value of y in $(Ca_{x1}Ba_{x2}Sr_{1-x1-x2})(Ti_yZr_{1-y})O_3$, which was a material for perovskite powder, was set to 0.04.

In the perovskite powder, 2 mol % of manganese compound was added in a shape of $MnCO_3$. Further, 1 mol % of 18CEZ was added to the perovskite powder. Other conditions were the same as those of the example 1.

(Example 20) The value of y in $(Ca_{x1}Ba_{x2}Sr_{1-x1-x2})(Ti_yZr_{1-y})O_3$, which was a material for perovskite powder, was set to 0.04.

In the perovskite powder, 2 mol % of silicon compound was added in a shape of $SiO_2$. Further, 3 mol % of 18CEZ was added to the perovskite powder. Other conditions were the same as those of the example 1.

(Example 21) The value of $x_2$ in $(Ca_{x1}Ba_{x2}Sr_{1-x1-x2})(Ti_yZr_{1-y})O_3$, which was a material for perovskite powder, was set to 0.01. Other conditions were the same as those of the example 1.

(Example 22) The value of $x_1$ in $(Ca_{x1}Ba_{x2}Sr_{1-x1-x2})(Ti_yZr_{1-y})O_3$, which was the material of the perovskite powder, was set to 0.65, and the value of $x_2$ was set to 0.1. Other conditions were the same as those of the example 1.

(Comparative Example 1) The value of $x_1$ in $(Ca_{x1}Ba_{x2}Sr_{1-x1-x2})(Ti_yZr_{1-y})O_3$, which was a material for perovskite powder, was set to 0.5. In the perovskite powder, 0.2 mol % of boron compound was added in a shape of $(B_2O_3)/2$. Other conditions were the same as those of the example 1.

(Comparative Example 2) The value of $x_1$ in $(Ca_{x1}Ba_{x2}Sr_{1-x1-x2})(Ti_yZr_{1-y})O_3$, which was a material for perovskite powder, was set to 0.95. Further, 6CEZ was added to the perovskite powder at a concentration of 3 mol %. Other conditions were the same as those of the example 1.

(Comparative Example 3) The value of $x_1$ in $(Ca_{x1}Ba_{x2}Sr_{1-x1-x2})(Ti_yZr_{1-y})O_3$, which was the material of the perovskite powder, was set to 0.8, and the value of y was set to 0.12. In the perovskite powder, 1.5 mol % of manganese compound was added in a shape of $MnCO_3$, and 0.4 mol % of boron compound was added in a shape of $(B_2O_3)/2$. Further, 1.5 mol % of 6CEZ was added to the perovskite powder. Other conditions were the same as those of the example 1.

(Comparative Example 4) 6CEZ was added to the perovskite powder at a concentration of 0.3 mol %. Other conditions were the same as those of the example 1.

(Comparative Example 5) In the perovskite powder, 1.5 mol % of manganese compound was added in a shape of $MnCO_3$, 2 mol % of silicon compound was added in a shape of $SiO_2$, and 0.5 mol % of boron compound was added in a shape of $(B_2O_3)/2$. Further, 7 mol % of 6CEZ was added to the perovskite powder. Other conditions were the same as those of the example 1.

(Comparative Example 6) The value of $x_1$ in $(Ca_{x1}Ba_{x2}Sr_{1-x1-x2})(Ti_yZr_{1-y})O_3$, which was the material of the perovskite powder, was 0.45, the value of x2 was 0.15, and the value of y was 0.05. Other conditions were the same as those of the example 1.

Table 2 is a table showing the results of quality investigation of the dielectric layer 11 according to each of the examples 1 to 22 and the comparative examples 1 to 6. As the quality of the dielectric layer 11, the relative permittivity (εr), the Q value, the temperature coefficient (τC), high temperature insulation characteristic, the accelerated life, and the three-point bending strength were adopted. Further, Table 2 also shows the firing temperature of the dielectric layer 11 and the ratio of the ceria zirconia solid solution phase contained in the dielectric layer 11.

TABLE 2

| | FIRING TEMPERATURE (° C.) | RELATIVE PERMITTIVITY | Q | τ C (ppm/° C.) | HIGH TEMPERATURE INSULATION CHARACTERISTIC | ACCELARATED LIFE (h) | 3 POINT BENDING STRENGTH (MPa) | CERIA ZIRCONIA SOLID SOLUTION (mol %) |
|---|---|---|---|---|---|---|---|---|
| EXAMPLE 1 | 1200 | 32.5 | 6300 | 21 | ○ | 800 | 300 | 4.3 |
| EXAMPLE 2 | 1200 | 31 | 5600 | 20 | ○ | 760 | 290 | 4.4 |
| EXAMPLE 3 | 1200 | 33 | 7000 | 23 | ○ | 800 | 278 | 3.5 |
| COMPARATIVE EXAMPLE 1 | 1210 | 37.5 | 5000 | −310 | ○ | 770 | 280 | 3.3 |
| EXAMPLE 4 | 1200 | 36 | 4500 | −230 | ○ | 700 | 285 | 3.4 |
| EXAMPLE 5 | 1190 | 29 | 6000 | 27 | ○ | 1100 | 280 | 4.6 |
| COMPARATIVE EXAMPLE 2 | 1190 | 28 | 5000 | 35 | ○ | 900 | 240 | 5.2 |
| EXAMPLE 6 | 1180 | 33 | 5600 | 37 | ○ | 780 | 260 | 3.3 |
| EXAMPLE 7 | 1180 | 33.5 | 4600 | 15 | ○ | 680 | 265 | 3.6 |
| EXAMPLE 8 | 1200 | 35 | 3200 | −22 | ○ | 530 | 271 | 2.5 |
| EXAMPLE 9 | 1180 | 37.5 | 3300 | −150 | ○ | 510 | 278 | 1.3 |
| COMPARATIVE EXAMPLE 3 | 1200 | 38 | 2200 | −345 | x | 480 | 280 | 2.3 |
| EXAMPLE 10 | 1200 | 30.5 | 5500 | 28 | ○ | 670 | 267 | 2 |
| EXAMPLE 11 | 1170 | 31.5 | 4800 | 35 | ○ | 550 | 296 | 4.3 |
| EXAMPLE 12 | 1185 | 30.5 | 4400 | −28 | ○ | 640 | 286 | 4.1 |
| EXAMPLE 13 | 1170 | 32 | 3300 | −43 | ○ | 670 | 270 | 6 |
| EXAMPLE 14 | 1190 | 33 | 6500 | −23 | ○ | 890 | 290 | 4.5 |
| EXAMPLE 15 | 1200 | 34.5 | 6700 | −34 | ○ | 770 | 265 | 4.2 |
| COMPARATIVE EXAMPLE 4 | 1200 | 32 | 5500 | −38 | x | 570 | 160 | 0.2 |
| EXAMPLE 16 | 1220 | 33 | 6000 | 165 | ○ | 790 | 256 | 10 |
| COMPARATIVE EXAMPLE 5 | NOT DENSIFIED AT 1220° C. OR LESS | | | | | | | |
| EXAMPLE 17 | 1200 | 34 | 5700 | 40 | ○ | 880 | 255 | 3 |
| EXAMPLE 18 | 1200 | 33 | 5000 | 78 | ○ | 900 | 268 | 5.1 |
| EXAMPLE 19 | 1200 | 33 | 4300 | 125 | ○ | 870 | 256 | 3.1 |
| EXAMPLE 20 | 1200 | 32 | 4600 | 180 | ○ | 900 | 275 | 5.2 |
| EXAMPLE 21 | 1200 | 33 | 3300 | −30 | ○ | 880 | 260 | 3.3 |
| EXAMPLE 22 | 1200 | 43 | 3400 | −230 | ○ | 650 | 250 | 3.4 |
| COMPARATIVE EXAMPLE 6 | 1200 | 44 | 3000 | −330 | x | 700 | 135 | 3.3 |

Here, the electrostatic capacity and the Q value were measured using an LCR meter under a setting condition of 1 kHz-1 Vrms. The relative permittivity εr was obtained from the electrostatic capacity C based on the following equation.

$$\varepsilon r = (C \times \text{thickness of the dielectric layer } 11)/(\text{number of layers of the dielectric layer } 11 \times \varepsilon 0 \times \text{effective crossing area})$$

However, ε0 is the permittivity of the vacuum. The temperature coefficient (τC) is the amount of change (ppm) in electrostatic capacity when the temperature changes by 1° C. Here, the temperature coefficient was obtained from the difference in electrostatic capacity between 25° C. and 125° C. The electrostatic capacity was measured in a constant temperature bath.

The accelerated life was the average value of the time from heating the multilayer ceramic capacitor 100 to 200° C. in an electric field of 50 V/μm until the insulation resistance value drops by two orders of magnitude from the initial value.

The 3-point bending strength was an average value when a 3-point bending test was performed on a plurality of multilayer ceramic capacitors 100.

An insulation resistance value at 150° C.-100V-60 seconds was measured as the high temperature insulation characteristic.

It was judged as good when the relative permittivity was 29 or more, the Q value was 2000 or more, the temperature coefficient was within the range of ±300 ppm/° C., the accelerated life was 500 hours or more, the three-point bending test was 250 MPa or more, and the high temperature insulation characteristic was 10 GΩ or more. As for the firing temperature, those that can be densified and fired at 1220° C. or lower were determined as good.

As shown in Table 2, in the examples 1 to 24, the qualities of the dielectric layer 11 were all within the acceptable range.

On the other hand, in the comparative example 1, the temperature coefficient was −310 ppm/° C., which was outside the acceptable range (range of ±300 ppm/° C.). It is thought that this is because, in the comparative example 1, the value of the composition ratio $x_1$ was less than 0.6 in $(Ca_{x1}Ba_{x2}Sr_{1-x1-x2})(Ti_yZr_{1-y})O_3$, which was the material of the perovskite powder.

Further, in the comparative example 2, the relative permittivity was 28, which was out of the acceptable range (29 or more). And the three-point bending strength was 240 Mpa, which was out of the acceptable range. It is thought that this is because, in the comparative example 2, the value of the composition ratio $x_1$ in $(Ca_{x1}Ba_{x2}Sr_{1-x1-x2})(Ti_yZr_{1-y})O_3$, which was the material of the perovskite powder, exceeded 0.9.

In the comparative example 3, the temperature coefficient was −345 ppm/° C., which was outside the acceptable range (range of ±300 ppm/° C.). And the accelerated life was 480 h, which was out of the acceptable range (500 h or more). It is thought that this is because, in the comparative example 3, the value of the composition ratio y exceeded 0.1 in $(Ca_{x1}Ba_{x2}Sr_{1-x1-x2})(Ti_yZr_{1-y})O_3$, which was the material of the perovskite powder. The high temperature insulation characteristic was out of the acceptable range.

In the comparative example 4, the three-point bending strength was 160 MPa, which was out of the acceptable range (250 MPa or more). It is thought that this is because, in the comparative example 4, the amount of 6CEZ added to the perovskite powder was less than 0.5 mol %, and the strength was not improved by the ceria zirconia solid solution. The high temperature insulation characteristic was out of the acceptable range.

In the comparative example 5, densifying was not achieved at a firing temperature of 1220° C. or lower. It is thought that this is because, in the comparative example 10, the amount of 6CEZ added to the perovskite powder exceeded 5.0 mol %.

In the comparative example 6, the three-point bending strength was 135 MPa, which was out of the acceptable range (250 MPa or more). The temperature coefficient was −330 ppm/° C., which was out of the acceptable range. It is thought that this is because, in the comparative example 11, the value of the composition ratio $x_1$ was less than 0.6 and the value of the composition ratio $x_2$ exceeded 0.1 in $(Ca_{x1}Ba_{x2}Sr_{1-x1-x2})(Ti_yZr_{1-y})O_3$ which was the material of the perovskite powder.

From the above results, in order to maintain the quality of the dielectric layer 11 even when the dielectric layer 11 is fired at a temperature of 1220° C. or lower, the concentration of the ceria zirconia solid solution should be 0.5 mol % or more and 5.0 mol % or less and the composition ratios of $x_1$, $x_2$, and y in $(Ca_{x1}Ba_{x2}Sr_{1-x1-x2})(Ti_yZr_{1-y})O_3$ are set to the range of $0.6 \leq x_1 \leq 0.9$, $0 \leq x_2 \leq 0.1$ and $0 \leq y \leq 0.1$.

In the examples 1 to 22, the dielectric layer 11 can be fired at a temperature of 1220° C. or lower. Moreover, it is possible to provide the high-quality and high strength multilayer ceramic capacitor 100 satisfying the temperature characteristics of ±250 ppm/° C. that do not cause structural defects such as delamination and cracks in the dielectric layer 11 and satisfy the criteria of C0K, C0J, C0H, and C0G of EIA (Electronic Industries Alliance) and the temperature characteristics of ±300 ppm/° C. corresponding to the R2H and S2K standards of EIA.

Figure 8:
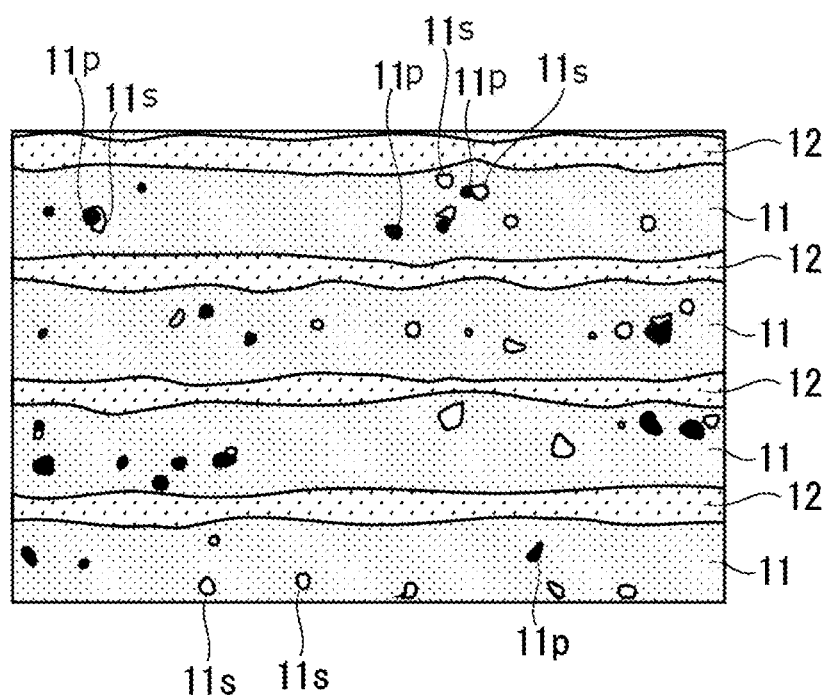
FIG. 8 schematically illustrates a polished surface having a cross section perpendicular to a stacking direction of dielectric layer and internal electrode layer of a multilayer ceramic capacitor according to an example 1 in a SEM-EDS image.

FIG. 8 shows a polished surface having a cross section perpendicular to the stacking direction of the dielectric layer 11 and the internal electrode layer 12 of the multilayer ceramic capacitor 100 according to the example 1 in a SEM-BSE (Scanning Electron Microscope-Backscattered Electron). The SEM magnification was 5000 times.

For identification and quantification of the composition of the dielectric layer 11, in addition to chemical analysis by ICP (Inductively Coupled Plasma) emission spectroscopic analysis, the cross section of the dielectric layer 11 as illustrated in FIG. 8 is observed by SEM-EDS (Scanning Electron Microscope-Energy Dispersive X-ray Spectroscopy). In the analysis, a sufficiently large area is secured so as not to be affected by the segregated composition, and if necessary, the standard sample as the calibration curve is simultaneously analyzed, compared, and quantified to determine the reliability of the quantitative analysis value.

Further, as described above, when the concentration of the ceria zirconia solid solution is 0.5 mol % or more and 5.0 mol % or less when $(Ca_{x1}Ba_{x2}Sr_{1-x1-x2})(Ti_yZr_{1-y})O_3$ is 100 mol %, it has been clarified that the area ratio of grains 11p of the ceria zirconia solid solution in the cross section of the dielectric layer 11 is 1% or more and 15% or less. The area ratio is defined by the ratio of the total area of all the grains 11p contained in a region to the area of the region. The region is obtained by cutting out a region having an area of 10 μm² from an arbitrary position on the SEM cross section of the dielectric layer 11.

Further, a plurality of voids 11s are formed in the dielectric layer 11, and the toughness of the dielectric layer 11 is improved by the voids 11s. However, if the total area of the voids 11s is too large, the mechanical strength such as the three-point bending strength of the dielectric layer 11 will decrease. Therefore, by making the total area occupied by the voids 11s in the cross section of the dielectric layer 11 smaller than the total area occupied by the grains 11p in the cross section of the dielectric layer 11, it is preferable that reduction of the mechanical strength of the dielectric layer 11 caused by the voids 11s is suppressed.

The total area of the voids 11s is defined as the total value of the areas of all the voids 11s included in a region obtained by cutting out a region having an area of 10 μm² from an arbitrary position on the SEM cross section of the dielectric layer 11. Further, the total area of the grains 11p is defined as the total value of the areas of all the grains 11p included in the same region used to calculate the total area of the voids 11s.

Further, even if one of the voids 11s is too large, the mechanical strength of the dielectric layer 11 is lowered. Therefore, it is preferable that the longitudinal diameter of the void 11s in cross-sectional view is 0.1 μm or more and 0.6 μm or less. The lower limit of the longitudinal diameter is set to 0.1 μm because it is difficult to improve the toughness of the dielectric layer 11 with use of the voids 11s smaller than this. Further, the reason why the upper limit of the longitudinal diameter is set to 0.6 μm is that if the longitudinal diameter is larger than the upper limit, the mechanical strength of the dielectric layer 11 decreases due to the voids 11s.

More preferably, the longitudinal diameter of the void 11s in the cross-sectional view is preferably 0.15 μm or more and 0.3 μm or less. This is because the mechanical quality of the dielectric layer 11 can be maintained in a high state.

Further, it is preferable that the grains 11p of the ceria zirconia solid solution are in contact with the voids 11s in the cross section of the dielectric layer 11. As a result, it is possible to suppress the occurrence of cracks in the dielectric layer 11 starting from the voids 11s by the grains 11p having mechanical strength.

Although the embodiments of the present invention have been described in detail, it is to be understood that the various change, substitutions, and alterations could be made hereto without departing from the spirit and scope of the invention.

What is claimed is:

1. A ceramic electronic device comprising:
   a dielectric layer and an internal electrode layer that are alternately stacked,
   wherein the dielectric layer contains ceria zirconia solid solution and $(Ca_{x1}Ba_{x2}Sr_{1-x1-x2})(Ti_yZr_{1-y})O_3$ ($0.6 \leq x_1 \leq 0.9$, $0 \leq x_2 \leq 0.1$, $0 \leq y \leq 0.1$) as a main component, and
   wherein, in the dielectric layer, a concentration of the ceria zirconia solid solution is 0.5 mol % or more and 5.0 mol % or less when $(Ca_{x1}Ba_{x2}Sr_{1-x1-x2})(Ti_yZr_{1-y})O_3$ is 100 mol %.

2. The ceramic electronic device as claimed in claim 1,
   wherein the dielectric layer includes a manganese compound, a silicon compound, and a boron compound, and
   wherein, in the dielectric layer, a concentration of the manganese compound is 0.2 mol % or more and 5.0 mol % or less in a shape of MnO, a concentration of the silicon compound is 0.5 mol % or more and 5.0 mol % or less in a shape of $SiO_2$, a concentration of the boron compound is 0.2 mol % or more and 1.0 mol % or less in a shape of $(B_2O_3)/2$, when the main component is 100 mol %.

3. The ceramic electronic device as claimed in claim 1, wherein an area ratio of grains of the ceria zirconia solid solution is 1% or more and 15% or less in a cross section of the dielectric layer.

4. The ceramic electronic device as claimed in claim 3, wherein the dielectric layer includes a plurality of voids, and
wherein a total area of the plurality of voids is smaller than a total area of the grains of the ceria zirconium solid solution, in a cross section of the dielectric layer.

5. The ceramic electronic device as claimed in claim 4, wherein each of longitudinal diameters of the plurality of voids is 0.1 μm or more and 0.6 μm or less.

6. The ceramic electronic device as claimed in claim 4, wherein at least one of the plurality of voids and at least one of the grains are in contact with each other.

7. The ceramic electronic device as claimed in claim 1, wherein a thickness of the dielectric layer is 2 μm or less.

8. A dielectric material comprising:
ceria zirconia solid solution; and
$(Ca_{x1}Ba_{x2}Sr_{1-x1-x2})(Ti_yZr_{1-y})O_3$ $(0.6 \leq x_1 \leq 0.9, 0 \leq x_2 \leq 0.1, 0 \leq y \leq 0.1)$ as a main component,
wherein a concentration of the ceria zirconia solid solution is 0.5 mol % or more and 5.0 mol % or less when the main component is 100 mol %.

9. The dielectric material as claimed in claim 8 further comprising:
wherein a concentration of the manganese compound is 0.2 mol % or more and 5.0 mol % or less in a shape of MnO, a concentration of the silicon compound is 0.5 mol % or more and 5.0 mol % or less in a shape of $SiO_2$, a concentration of the boron compound is 0.2 mol % or more and 1.0 mol % or less in a shape of $(B_2O_3)/2$, when the main component is 100 mol %.

10. A manufacturing method of a ceramic electronic device comprising:
forming a multilayer structure in which a dielectric green sheet including ceramic powders and a metal conductive paste for forming an internal electrode layer are alternately stacked; and
firing the multilayer structure,
wherein the ceramic powders include ceria zirconia solid solution and $(Ca_{x1}Ba_{x2}Sr_{1-x1-x2})(Ti_yZr_{1-y})O_3$ $(0.6 \leq x_1 \leq 0.9, 0 \leq x_2 \leq 0.1, 0 \leq y \leq 0.1)$ as a main component, and
wherein, in the ceramic powders, a concentration of the ceria zirconia solid solution is 0.5 mol % or more and 5.0 mol % or less when $(Ca_{x1}Ba_{x2}Sr_{1-x1-x2})(Ti_yZr_{1-y})O_3$ is 100 mol %.

11. The manufacturing method as claimed in claim 10, wherein the ceramic powders include a boron nitride,
wherein a concentration of the boron nitride is 0.2 mol % or more and 1.0 mol % or less in a shape of $(B_2O_3)/2$, when the main component is 100 mol % in the ceramic powders, and
the boron nitride has a specific surface area of 100 $m^2/g$ or more and 300 $m^2/g$ or less.

* * * * *